United States Patent [19]

Shawver et al.

[11] Patent Number: 5,540,976
[45] Date of Patent: Jul. 30, 1996

[54] NONWOVEN LAMINATE WITH CROSS DIRECTIONAL STRETCH

[75] Inventors: Susan E. Shawver; Leslie W. Collier, IV, both of Roswell; Paul W. Estey, Cumming, all of Ga.

[73] Assignee: Kimberly-Clark Corporation, Neenah, Wis.

[21] Appl. No.: 371,333

[22] Filed: Jan. 11, 1995

[51] Int. Cl.⁶ .................................................. B32B 27/14
[52] U.S. Cl. ...................... 428/198; 428/284; 428/296; 428/297; 428/298; 428/373; 428/374; 428/903; 604/358; 604/367; 604/369
[58] Field of Search ....................... 428/284, 296, 428/297, 298, 300, 373, 374, 198, 903, 102; 604/358, 367, 369

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,538 | 3/1970 | Petersen | 161/150 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 3,855,046 | 12/1974 | Hansen et al. | 161/150 |
| 3,949,128 | 4/1976 | Ostermeier | 428/152 |
| 4,144,370 | 3/1979 | Boulton | 428/233 |
| 4,209,563 | 6/1980 | Sisson | 428/288 |
| 4,251,587 | 2/1981 | Mimura et al. | 429/233 |
| 4,280,860 | 7/1991 | Shen et al. | 156/167 |
| 4,296,163 | 10/1981 | Emi et al. | 428/212 |
| 4,340,563 | 7/1982 | Appel et al. | 264/518 |
| 4,426,420 | 1/1984 | Likhyani | 428/224 |
| 4,443,513 | 4/1984 | Meitner et al. | 422/195 |
| 4,515,854 | 5/1985 | Kogame et al. | 428/288 |
| 4,555,811 | 12/1985 | Shimalla | 2/51 |
| 4,600,605 | 7/1986 | Nakai et al. | 427/379 |
| 4,631,933 | 12/1986 | Carey, Jr. | 66/192 |
| 4,657,802 | 4/1987 | Morman | 428/152 |
| 4,663,220 | 5/1987 | Wisneski et al. | 428/221 |
| 4,692,368 | 9/1987 | Taylor et al. | 428/137 |
| 4,707,398 | 11/1987 | Boggs | 428/224 |
| 4,720,415 | 1/1988 | Vander Wielen et al. | 428/152 |
| 4,741,949 | 5/1988 | Morman et al. | 428/224 |
| 4,753,839 | 6/1988 | Greenway | 428/152 |
| 4,761,324 | 8/1988 | Rautenberg et al. | 428/198 |
| 4,775,579 | 10/1988 | Hagy et al. | 428/284 |
| 4,777,080 | 10/1988 | Harris, Jr. et al. | 428/212 |
| 4,781,966 | 11/1988 | Taylor | 428/152 |
| 4,783,231 | 11/1988 | Raley | 156/167 |
| 4,803,117 | 2/1989 | Daponte | 428/288 |
| 4,833,012 | 5/1989 | Makimura et al. | 428/288 |
| 4,874,447 | 10/1989 | Hazelton et al. | 156/167 |
| 4,879,170 | 11/1989 | Radwanski et al. | 428/233 |
| 4,883,709 | 11/1989 | Nozaki et al. | 428/288 |
| 4,891,957 | 1/1990 | Strack et al. | 66/192 |
| 4,939,016 | 7/1990 | Radwanski et al. | 428/152 |
| 4,965,122 | 10/1990 | Morman | 428/225 |
| 4,981,747 | 1/1991 | Morman | 428/198 |
| 5,102,724 | 4/1992 | Okawahara et al. | 428/224 |
| 5,108,820 | 4/1992 | Kaneko et al. | 428/198 |
| 5,108,827 | 4/1992 | Gessner | 428/219 |
| 5,116,662 | 5/1992 | Morman | 428/198 |
| 5,120,599 | 6/1992 | Lewis | 428/298 |
| 5,188,885 | 2/1993 | Timmons et al. | 428/296 |
| 5,229,191 | 7/1993 | Austin | 428/296 |
| 5,238,733 | 8/1993 | Joseph et al. | 428/284 |
| 5,270,107 | 12/1993 | Gessner | 428/296 |
| 5,294,482 | 3/1994 | Gessner | 428/296 |
| 5,302,443 | 4/1994 | Manning et al. | 428/296 |
| 5,308,691 | 5/1994 | Lim et al. | 428/296 |
| 5,324,580 | 6/1994 | Allan et al. | 428/296 |
| 5,332,613 | 7/1994 | Taylor et al. | 428/296 |
| 5,336,552 | 8/1994 | Strack et al. | 428/296 |
| 5,382,400 | 1/1995 | Pike et al. | 428/296 |

FOREIGN PATENT DOCUMENTS

| | | | |
|---|---|---|---|
| 0586924A1 | 3/1994 | European Pat. Off. | D04H 1/54 |
| WO93/15247 | 8/1993 | WIPO | D04H 1/48 |
| WO93/15248 | 8/1993 | WIPO | D04H 1/48 |

OTHER PUBLICATIONS

*Polymer Blends and Composites* by John A. Manson and Leslie H. Sperling, Plenum Press, New York, Copyright 1976, ISBN 0–306–30831–2, pp. 273–277.

Primary Examiner—James J. Bell
Attorney, Agent, or Firm—James B. Robinson

[57] ABSTRACT

There is provided a nonwoven fabric laminate having cross-directional stretch properties. The laminate is comprised of at least three layers. The outer layers are spunbond nonwoven fiber webs which are made of crimped or crimpable fibers. The inner layer is an elastomeric polymer layer which may itself be composed of one or more thinner layers. The layers are preferably produced by sequentially depositing them onto a moving forming wire and bonding them together by a method excluding hydroentanglement to form the laminate.

19 Claims, No Drawings

NONWOVEN LAMINATE WITH CROSS DIRECTIONAL STRETCH

BACKGROUND OF THE INVENTION

This invention relates to the field of nonwoven fabrics for use in medical products, personal care products, garments and outdoor fabrics.

The manufacture of many products from nonwoven fabrics can be a very complicated affair involving many different cutting and joining steps. For example, the process of making a surgical gown from nonwoven fabrics involves cutting holes for the sleeves and the head in a large piece of material, cutting material for the sleeves, and then joining the sleeves, generally composed of two pieces, together with each other and the main body of the gown. Certain gowns have reinforced areas (e.g. the elbows) for which additional pieces must be cut, placed and joined. There may be button holes or other manner of attachment or closure required on the arms, back or front of the gown. This manufacturing process requires pieces of fabric to be rotated, turned upside down, folded, etc., many times.

One of the characteristics of certain types of nonwoven fabrics which is useful in a variety of applications is elasticity, i.e. the ability to be stretched and then return to approximately its original size. Such a characteristic is useful in, for example, medical gowns, diapers, training pants, and adult incontinence products.

Stretchable nonwoven fabrics have been produced but have generally been limited to stretch in the machine direction (MD), i.e. the direction of production of the fabric. This is useful, but it has been found that many manufacturing processes would greatly benefit from nonwoven fabrics which could stretch in the cross-machine direction (CD). While a seemingly trivial issue, the requirement of repeatedly turning the nonwoven fabric during the manufacturing process, of for example, a gown, can result in damaged fabric, increased maintenance costs and, of course, increased capital costs for the initial purchase of the manufacturing line equipment. Cross-machine stretchable nonwovens would simplify the manufacturing process by eliminating a large number of rotating steps where the MD stretchable material must be turned in order to give stretch in the desired direction.

Accordingly, it is an object of this invention to provide a nonwoven fabric laminate which is stretchable in at least the cross-machine direction.

SUMMARY

The objects of the invention are provided by a multilayer laminate having cross-directional stretch in which the outer layers are crimped or crimpable spunbond polymer webs or fabrics which can be bicomponent fibers and at least one inner layer which is an elastomeric polymer layer. The layers are maintained in an unstretched condition throughout their production and bonding into the laminate.

DETAILED DESCRIPTION

Definitions

As used herein the term "nonwoven fabric or web" means a web having a structure of individual fibers or threads which are interlaid, but not in an identifiable or regularly repeating manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 50 microns, for example, having an average diameter of from about 0.5 microns to about 50 microns, or more particularly, microfibers may have an average diameter of from about 2 microns to about 40 microns. The diameter of, for example, a polypropylene fiber given in microns, may be converted to denier by squaring, and multiplying the result by 0.00629, thus, a 15 micron polypropylene fiber has a denier of about 1.42 ($15^2 \times 0.00629 = 1.415$).

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Levy, and U.S. Pat. No. 3,542,615 to Dobo et al. Spunbond fibers are generally continuous and larger than 7 microns, more particularly, often between about 10 and 30 microns.

As used herein the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are usually microfibers which are generally smaller than 10 microns in diameter.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configuration of the material. These configurations include, but are not limited to isotactic, syndiotactic, atactic and random symmetries.

As used herein, the term "machine direction" or "MD" means the length of a fabric as it is produced. The term "cross machine direction", "cross-direction" or "CD" means across the width of fabric, i.e. a direction generally perpendicular to the MD.

As used herein the term "bicomponent fibers" refers to fibers which have been formed from at least two polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another or may be a side by side arrangement or an "islands-in-the-sea" arrangement. Bicomponent fibers are taught in U.S. Pat. No. 5,108,820 to Kaneko et al., U.S. Pat. No. 5,336,552 to Strack et al., and European Patent 0586924. For two component fibers, the polymers may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, the terms "necking" or "neck stretching" interchangeably refer to a method of elongating a nonwoven fabric, generally in the machine direction, to reduce its width in a controlled manner to a desired amount. The controlled stretching may take place under cool, room temperature or greater temperatures and is limited to an increase in overall dimension in the direction being stretched up to the elongation required to break the fabric, which in most cases is about 1.2 to 1.4 times. When relaxed, the web retracts toward its original dimensions. Such a process is disclosed, for example, in U.S. Pat. No. 4,443,513 to Meitner and Notheis and another in U.S. Pat. No. 4,965,122 to Morman.

As used herein the term "neck softening" means neck stretching carried out without the addition of heat to the material as it is stretched.

As used herein, the term "neckable material" means any material which can be necked.

As used herein, the term "necked material" refers to any material which has been constricted in at least one dimension by processes such as, for example, drawing or gathering.

As used herein the term "recover" refers to a contraction of a stretched material upon termination of a biasing force following stretching of the material by application of the biasing force. For example, if a material having a relaxed, unbiased length of one (1) inch was elongated 50 percent by stretching to a length of one and one half (1.5) inches the material would have been elongated 50 percent and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its elongation.

As used herein the term "un-necking" means a process applied to a reversibly necked material to extend it to at least its original, pre-necked dimensions by the application of a stretching force in a longitudinal or cross-machine direction which causes it to recover to within at least about 50 percent of its reversibly necked dimensions upon release of the stretching force.

As used herein, the term "stitchbonded" means, for example, the stitching of a material such as in accordance with U.S. Pat. No. 4,891,957 to Strack et al. or U.S. Pat. No. 4,631,933 to Carey, Jr.

As used herein, the term "medical product" means surgical gowns and drapes, face masks, head coverings, shoe coverings, wound dressings, bandages and sterilization wraps.

As used herein, the term "personal care product" means diapers, baby bibs, training pants, absorbent underpants, adult incontinence products, wipers and feminine hygiene products.

As used herein, the term "protective cover" means a cover for vehicles such as cars, trucks, boats, airplanes, motorcycles, bicycles, golf carts, etc., covers for equipment often left outdoors like grills, yard and garden equipment (lawnmowers, roto-tillers, etc.) and lawn furniture, as well as floor coverings, table cloths and picnic area covers.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics (e.g. row covers) and outdoor apparel such as head coverings, industrial work wear and coveralls, pants, shirts, jackets, gloves, socks, shoe coverings, and the like.

TEST METHODS

Melt Flow Rate: The melt flow rate (MFR) is a measure of the viscosity of a polymers. The MFR is expressed as the weight of material which flows from a capillary of known dimensions under a specified load or shear rate for a measured period of time and is measured in grams/10 minutes at 230° C. according to, for example, ASTM test 1238, condition E.

Grab Tensile test: The grab tensile test is a measure of breaking strength and elongation or strain of a fabric when subjected to unidirectional stress between two clamps. Values for grab tensile strength and grab elongation are obtained using a specified width of fabric, clamp width and a constant rate of extension. The sample is as wide as the clamps and longer than the distance between the clamps to give results representative of effective strength of fibers in the clamped width combined with additional strength contributed by adjacent fibers in the fabric. This closely simulates fabric stress conditions in actual use. Results are expressed as pounds to break and percent stretch to break. Total energy can also be expressed as well as energy to break. Higher numbers indicate stronger or more stretchable fabric.

Cyclic testing: In cyclic testing a material is taken to a fixed extension or fixed load to develop a graphical representation of the results, with load on the y axis and elongation on the x axis. This graph yields a curve with an area thereunder called the Total Energy Absorbed or "TEA". The ratio of the TEA curves for a sample for various cycles is a value independent of material, basis weight and sample width that can be compared to other samples.

DETAILED DESCRIPTION

The laminate fabric of this invention comprises a layered construction of at least one layer of an elastomeric thermoplastic polymer layer sandwiched between layers of crimped fiber or filament spunbond nonwoven fabric. The spunbond fibers may be bicomponent.

The elastomeric thermoplastic polymer layer useful in the practice of this invention may be those made from styrenic block copolymers, polyurethanes, polyamides, copolyesters, ethylene vinyl acetates (EVA) and the like and may be a meltblown web, a spunbond web, a film or a foam layer and may itself be composed of one or more thinner layers of elastomeric thermoplastic polymer. Generally, any suitable elastomeric fiber, film or foam forming resins or blends containing the same may be utilized to form the nonwoven webs of elastomeric fibers, elastomeric film or elastomeric foam.

Styrenic block copolymers include styrene/butadiene/styrene (SBS) block copolymers, styrene/isoprene/styrene (SIS) block copolymers, styrene/ethylene-propylene/styrene (SEPS) block copolymers, styrene/ethylene-butadiene/styrene (SEBS) block copolymers. For example, useful elastomeric fiber forming resins include block copolymers having the general formula A-B-A' or A-B, where A and A' are each a thermoplastic polymer endblock which contains a styrenic moiety such as a poly (vinyl arene) and where B is an elastomeric polymer midblock such as a conjugated diene or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated $(A-B)_m-X$, wherein X is a polyfunctional atom or molecule and in which each $(A-B)_m$- radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer" and particularly "A-B-A'" and "A-B" block copolymer, is intended to embrace all block copolymers having such rubbery blocks and thermoplastic blocks as discussed above, which can be extruded (e.g., by meltblowing), and without limitation as to the number of blocks.

U.S. Pat. No. 4,663,220 to Wisneski et al. discloses a web including microfibers comprising at least about 10 weight percent of an A-B-A' block copolymer where "A" and "A'" are each a thermoplastic endblock which comprises a styrenic moiety and where "B" is an elastomeric poly(ethylene-butylene) midblock, and from greater than 0 weight percent up to about 90 weight percent of a polyolefin which when blended with the A-B-A' block copolymer and subjected to an effective combination of elevated temperature and elevated pressure conditions, is adapted to be extruded, in blended form with the A-B-A' block copolymer. Polyolefins useful in Wisneski et al. may be polyethylene, polypropylene, polybutene, ethylene copolymers, propylene copolymers, butene copolymers, and mixtures thereof.

Commercial examples of such elastomeric copolymers are, for example, those known as KRATON® materials which are available from Shell Chemical Company of Houston, Tex. KRATON® block copolymers are available in several different formulations, a number of which are identified in U.S. Pat. No. 4,663,220, hereby incorporated by reference. A particularly suitable elastomeric layer may be formed from, for example, elastomeric poly(styrene/ethylenebutylene/styrene) block copolymer available from the Shell Chemical Company of Houston, Tex. under the trade designation KRATON® G-1657.

Other exemplary elastomeric materials which may be used to form an elastomeric layer include polyurethane elastomeric materials such as, for example, those available under the trademark ESTANE® from B. F. Goodrich & Co., polyamide elastomeric materials such as, for example, those available under the trademark PEBAX® from the Rilsan Company, and polyester elastomeric materials such as, for example, those available under the trade designation HYTREL® from E. I. DuPont De Nemours & Company.

Formation of an elastomeric nonwoven web from polyester elastomeric materials is disclosed in, for example, U.S. Pat. No. 4,741,949 to Morman et al., hereby incorporated by reference.

Elastomeric layers may also be formed from elastomeric copolymers of ethylene and at least one vinyl monomer such as, for example, vinyl acetates, unsaturated aliphatic monocarboxylic acids, and esters of such monocarboxylic acids. The elastomeric copolymers and formation of elastomeric nonwoven webs from those elastomeric copolymers are disclosed in, for example, U.S. Pat. No. 4,803,117. Particularly useful elastomeric meltblown thermoplastic webs are composed of fibers of a material such as disclosed in U.S. Pat. No. 4,707,398 to Boggs, U.S. Pat. No. 4,741,949 to Morman et al., and U.S. Pat. No. 4,663,220 to Wisneski et al. In addition, the elastomeric meltblown thermoplastic polymer layer may itself be composed of one or more thinner layers of elastomeric meltblown thermoplastic polymer which have been sequentially deposited one atop the other or laminated together by methods known to those skilled in the art.

The thermoplastic copolyester elastomers include copolyetheresters having the general formula:

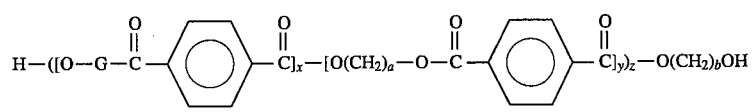

where "G" is selected from the group consisting of poly-(oxyethylene)-alpha,omega-diol, poly(oxypropylene)-alpha,omega-diol, poly(oxytetramethylene)-alpha,omega-diol and "a" and "b" are positive integers including 2, 4 and 6, "x", "y", and "z" are positive integers including 1–20. Such materials generally have an elongation at break of from about 600 percent to 750 percent when measured in accordance with ASTM D-638 and a melt point of from about 350° F. to about 400° F. (176° to 205° C.) when measured in accordance with ASTM D-2117. Commercial examples of such copolyester materials are, for example, those known as ARNITEL® formerly available from Akzo Plastics of Arnhem, Holland and now available from DSM of Sittard, Holland, or those known as HYTREL® which are available from E.I. dupont de Nemours of Wilmington, Del.

Examples of suitable foams include those produced by the General Foam Corporation of Paramus, N.J. Such foams are polyurethane foams under the trade designation "4000 Series". Such foams are described in U.S. Pat. No. 4,761,324 to Rautenberg et al. at column 6, lines 53–68, hereby incorporated by reference.

An elastomeric meltblown layer may be stitchbonded in accordance with U.S. Pat. No. 4,891,957 to Strack et al. Stitchbonding imparts strength and durability to the stitchbonded product and stitchbonding in the present invention is believed to impart increased abrasion resistance to the laminate. While stitchbonding generally is used to join two or more materials together, in this embodiment of the present invention the elastomeric meltblown layer is stitchbonded alone and then used in the fabrication of the laminate.

The spunbond nonwoven fabric is produced by a method known in the art and described in a number of the references cited above. Briefly, the spunbond process generally uses a hopper which supplies polymer to a heated extruder. The extruder supplies melted polymer to a spinneret where the polymer is fiberized as it passes through fine openings usually arranged in one or more rows in the spinneret, forming a curtain of filaments. The filaments are usually quenched with air at a low pressure, drawn, usually pneumatically, and deposited on a moving foraminous mat, belt or "forming wire" to form the nonwoven fabric.

The fibers produced in the spunbond process are usually in the range of from about 10 to about 30 microns in diameter, depending on process conditions and the desired end use for the fabrics to be produced from such fibers. For example, increasing the polymer molecular weight or decreasing the processing temperature result in larger diameter fibers. Changes in the quench fluid temperature and pneumatic draw pressure can also affect fiber diameter.

Polymers useful in the spunbond process generally have a process melt temperature of between about 350° F. to about 610° F. (175° C. to 320° C.) and a melt flow rate, as defined above, in the range of about 10 to about 150, more particularly between about 10 and 50. Examples of suitable polymers include polypropylenes, polyethylenes and polyamides.

Bicomponent fibers may also be used in the practice of this invention. Bicomponent fibers are commonly polypropylene and polyethylene arranged in a sheath/core, "islands in the sea" or side by side configuration. Suitable commercially available materials include polypropylene designated PP-3445 from the Exxon Chemical Company of Baytown, Tex., ASPUN® 6811A and 2553 linear low density polyethylene from the Dow Chemical Company of Midland, Mich., 25355 and 12350 high density polyethylene from the Dow Chemical Company, DURAFLEX® DP 8510 polybutylene available from the Shell Chemical Company of Houston, Tex., and ENATHENE® 720-009 ethylene n-butyl acrylate from the Quantum Chemical Corporation of Cincinnati, Ohio.

Certain biconstituent fibers may also be used in the practice of this invention. Blends of a polypropylene copolymer and polybutylene copolymer in a 90/10 mixture have been found effective. Any other blend would be effective as well provided they may be spun and provide crimped or crimpable fibers.

The fibers of the spunbond layer used in the practice of this invention must be crimped or crimpable since the inventors have found that crimped fiber webs, when laminated to an elastomeric meltblown layer, have enough "give" to stretch to a larger dimension without breaking.

The crimping of a spunbond fiber may be accomplished through a number of methods. One method is to produce a spunbond web onto a forming wire and then pass the web between two drums or rollers with differing surfaces. The rollers bend the fibers of the web as it passes therebetween and produces the desired crimp. Another method of creating fiber crimp is to mechanically stretch each fiber.

When bicomponent spunbond fibers are used in the practice of this invention, crimping may be accomplished by heating the fibers. The two polymers making up the bicomponent fibers may be selected to have different coefficients of expansion and so upon heating create crimps in the fibers. This heating may be done after the formation of the web on the forming wire at a temperature of from about 110° F. (43° C.) up to a temperature less than the melting point of the lower melting component of the fibers. This heating may alternatively be done as the fibers drop from the spinneret to the forming wire as taught in European patent application 586,924 to Pike et al., which was published on Mar. 16, 1994. In the Pike process, heated air in the range of from about 110° F. (43° C.) up to a temperature less than the melting point of the lower melting component of the fibers is directed at the fibers as they fall, causing the two polymers to expand differentially to one another and the fiber to crimp.

The laminated fabric of this invention may be made by first depositing onto a forming wire a layer of crimped spunbond fibers. A layer of elastomeric meltblown fibers is deposited on top of the crimped spunbond fibers. Lastly, another layer of crimped spunbond fibers is deposited atop the meltblown layer and this layer is usually preformed. There may be more than one layer of elastomeric meltblown fibers. None of the layers are stretched in any direction during the production process of the laminate, including the bonding step.

Alternatively, all of the layers may be produced independently and brought together in a separate lamination step. If this method of manufacture is chosen, it remains important that the layers not be stretched during the making of the laminate.

The requirement of the fabric being unstretched during fabrication into a laminate means that the fabric is not subjected to any additional or excessive stretching force beyond that normally provided by the type of mechanism that is usually used to produce the laminate, i.e. rollers and winders which move the fabric along the path of the process from pre- to post- lamination. The fabric of this invention does not need to be neck-stretched, neck softened or un-necked to provide the desired stretch properties.

After the addition of the last layer of crimped spunbond fibers, the layers are bonded to produce the laminate. The bonding may be done thermally such as by through-air bonding or by point bonding using patterned calender rolls.

Through-air bonding or "TAB" is discussed in European patent application 586,924 to Pike et al. and is a process of bonding a nonwoven bicomponent fiber web which is wound at least partially around a perforated roller which is enclosed in a hood. Air which is sufficiently hot to melt one of the polymers of which the fibers of the web are made is forced from the hood, through the web and into the perforated roller. The air velocity is between 100 and 500 feet per minute and the dwell time may be as long as 6 seconds. The melting and resolidification of the polymer provides the bonding. Since TAB requires the melting of at least one component to accomplish bonding, it is restricted to bicomponent fiber webs.

Thermal point bonding using calender rolls with various patterns have been developed. One example is the expanded Hansen Pennings pattern with about a 15% bond area with about 100 bonds/square inch as taught in U.S. Pat. No. 3,855,046 to Hansen and Pennings. Another common pattern is a diamond pattern with repeating and slightly offset diamonds.

The bonding of the laminate may alternatively be done ultrasonically, by print adhesive bonding by any other method known in the art to be effective except the method of hydroentanglement.

The fabric of this invention may be treated, either the individual layers prior to lamination or the entire fabric after lamination, with various chemicals in accordance with known techniques to give properties for specialized uses. Such treatments include water repellant chemicals, softening chemicals, fire retardant chemicals, oil repellant chemicals, antistatic agents and mixtures thereof. Pigments may also be added to the fabric as a post-bonding treatment or alternatively added to the polymer of the desired layer prior to fiberization.

It has been found that the fabric of this invention stretches in the cross-machine direction by at least about 100 percent.

The fabric of this invention may be used in personal care products, medical products, and outdoor fabrics. It is also believed this fabric would be useful in automotive applications such as car headliners.

The properties of various laminates were compared. These laminates are described below where the Samples are laminates made in accordance with this invention and the Control is not.

Control

Spunbond polypropylene fibers in both outer facing layers with an elastomeric meltblown layer in between.

The elastomeric meltblown was made from Shell's KRATON® G-2740 and had a basis weight of approximately 1.8 osy (61 gsm).

The spunbond fiber was Exxon PD-3445 polypropylene extruded through 0.6 mm holes at a rate of 0.7 grams/hole/minute (ghm) having a basis weight of 0.7 osy (22 gsm) for each facing layer. The fabric was bonded at a temperature of 291° F. using thermal calender bonding with a 5% spiral pattern. None of the layers was stretched during production or bonding.

Sample 1

Spunbond fibers in both outer facing layers with an elastomeric meltblown layer in between.

The elastomeric meltblown was made from Shell's KRATON® G-2740 and had a basis weight of approximately 1.8 osy (61 gsm).

The spunbond fabric was produced from a spin pack having alternate rows of fibers to produce a mixture of different types of fibers in one layer of fabric or web resulting in a crimpable web. One row of fibers was Exxon PD-3445 polypropylene and the next row was a blend of 90 weight percent of a Shell polypropylene copolymer and 10 weight percent Shell Duraflex® polybutylene copolymer. The polypropylene copolymer had an ethylene content of 3.2 weight percent and the polybutylene copolymer had an ethylene content of 6 weight percent. All polymers were extruded through 0.6 mm holes at a rate of 0.5 grams/hole/minute (ghm) and having a basis weight of 1.0 osy (34 gsm) for each facing layer. The fabric was bonded at a temperature of 291° F. using thermal calender bonding with a 5% spiral pattern. None of the layers was stretched during production or bonding.

Sample 2

Biconstituent spunbond fibers in both outer facing layers with an elastomeric meltblown layer in between.

The elastomeric meltblown was made from Shell's KRATON® G-2740 and had a basis weight of approximately 1.8 osy (61 gsm).

The spunbond was a biconstituent blend of 90 weight percent polypropylene copolymer and 10 weight percent polybutylene copolymer as described in Sample 1 extruded through 0.6 mm holes at a rate of 0.7 grams/hole/minute (ghm) and having a basis weight of 1.0 osy (34 gsm) for each facing layer to provide a crimpable web. The fabric was bonded at a temperature of 270° F. using thermal calender bonding with a 5% bonding area square pattern. None of the layers was stretched during production or bonding.

Sample 3

Biconstituent spunbond fibers in both outer facing layers with an elastomeric meltblown layer in between.

The elastomeric meltblown was made from Shell's KRATON® G-2740 and had a basis weight of approximately 1.8 osy (61 gsm).

The spunbond was a biconstituent blend of 90 weight percent polypropylene copolymer and 10 weight percent polybutylene copolymer as described in Sample 1 extruded through 0.6 mm holes at a rate of 0.53 grams/hole/minute (ghm) and having a basis weight of 0.7 osy (24 gsm) for each facing layer to provide a crimpable fiber. The fabric was bonded at a temperature of 291° F. using thermal calender bonding with a 5% bonding area square pattern. None of the layers was stretched during production or bonding.

Sample 4

Crimped bicomponent spunbond fibers in both outer facing layers with an elastomeric meltblown layer in between.

The elastomeric meltblown was made from Shell's KRATON® G-2740 and had a basis weight of approximately 1.8 osy (61 gsm).

The crimped spunbond was a side-by-side fiber of Exxon PD-3445 polypropylene and Dow Aspun® 6811A polyethylene extruded through 0.6 mm holes at a rate of 0.65 grams/hole/minute (ghm) and having a basis weight of 0.8 osy (27 gsm) for each facing layer. The fabric was bonded at a temperature of 258° F. using through-air bonding. None of the layers was stretched during production or bonding.

Sample 5

Crimped bicomponent spunbond fibers in both outer facing layers with an elastomeric meltblown layer in between.

The elastomeric meltblown was made from Shell's KRATON® G-2740 and had a basis weight of approximately 1.8 osy (61 gsm).

The crimped spunbond was a side-by-side fiber of Exxon PD-3445 polypropylene and Dow Aspun® 6811A polyethylene extruded through 0.6 mm holes at a rate of 0.65 grams/hole/minute (ghm) having a basis weight of 0.4 osy (13 gsm) for each facing layer. The fabric was bonded at a temperature of 258° F. using through-air bonding. None of the layers was stretched during production or bonding.

The above described laminates were subjected to tests for cross-machine direction stretch and recovery preformed on a Instron Sintech machine. A three inch wide sample was used and the stretching speed was 300 mm/min for peak load and peak strain. Peak elongation or strain is expressed in percent. Peak load is expressed in grams. Cycle testing elongation is expressed in percent. First cycle load at cycle elongation (A) is expressed in grams. The properties of the Samples are shown below in Table 1.

TABLE 1

|  | Peak Strain | Peak Load | Cycle Elong. | A |
|---|---|---|---|---|
| Control | 79 | 3690 | 50 | 2690 |
| Sample 1 | 130 | 3682 | 80 | 3720 |
| Sample 2 | 190 | 1420 | 125 | 1210 |
| Sample 3 | 125 | 2980 | 75 | 2230 |
| Sample 4 | 101 | 2970 | 55 | 2290 |
| Sample 5 | 25 | 1060 | 50 | 1420 |

The inventors believe that the data for crimped bicomponent fibers (Samples 4 and 5) would be improved with a different bond method though the cyclic testing data is favorable. The method used, through-air bonding, provides many bond spots and probably results in loss of stretchability, therefore, through-air bonding is not preferred. The other Samples and the Control did not use through-air bonding.

The data indicates that the fabric of this invention provides excellent cross-machine direction stretch at lower loads than for uncrimpable polypropylene spunbond. This is a very useful property which simplifies the manufacture of many products such as diapers and surgical gowns, from which this fabric is made.

What is claimed is:

1. A laminate having cross-directional stretch comprising:
    a first layer of a crimpable spunbond polymer web made from fibers selected from the group consisting of biconstituent and bicomponent fibers;
    a second layer of an elastomeric polymer;
    a third layer of a crimpable spunbond polymer web made from fibers selected from the group consisting of biconstituent and bicomponent fibers;
    wherein said layers are bonded together by a method excluding hydroentanglement to form a laminate with an open bond pattern having between about 5 and 15 percent bond area, said layers are maintained in an unstretched condition throughout their production and bonding into said laminate, and wherein said laminate stretches in the cross direction.

2. The laminate of claim 1 wherein said layers are bonded to each other in an unstretched condition by the method selected from the group consisting of thermal bonding, ultrasonic bonding, print bonding and adhesive bonding.

3. The laminate of claim 1 wherein said elastomeric polymer layer is selected from the group consisting of elastomeric meltblown webs, elastomeric spunbond webs, elastomeric films and elastomeric foams.

4. The laminate of claim 3 wherein said elastomeric polymer layer is comprised of one or more thinner layers.

5. The laminate of claim 3 wherein said elastomeric layer is stitchbonded prior to incorporation into said laminate.

6. The laminate of claim 3 wherein said elastomeric layer comprises at least about 10 weight percent of an A-B-A' block copolymer where "A" and "A'" are each a thermoplastic endblock which comprises a styrenic moiety and where "B" is an elastomeric poly(ethylenebutylene) midblock, and from greater than 0 weight percent up to about 90 weight percent of a polyolefin which when blended with the A-B-A' block copolymer and subjected to an effective combination of elevated temperature and elevated pressure conditions, is adapted to be extruded, in blended form with the A-B-A' block copolymer.

7. The laminate of claim 3 wherein said elastomeric polymer layer polymer is selected from the group consisting of styrenic block copolymers, polyurethanes, polyamides, copolyesters, copolyetheresters and ethylene vinyl acetates.

8. The laminate of claim 4 wherein said polymer is a mixture of an A-B-A' block copolymer and polypropylene.

9. The laminate of claim 4 wherein said elastomeric polymer layer comprises elastic fibers of a block copolymer.

10. The laminate of claim 9 wherein said polyetherester has the general formula:

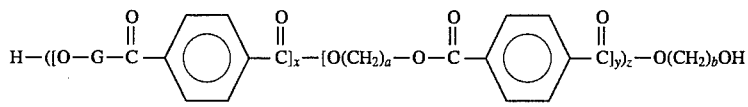

where "G" is selected from the group consisting of poly(oxyethylene)-alpha, omega-diol, poly(oxypropylene)-alpha, omega-diol, poly(oxytetramethylene)-alpha, omega-diol and "a" and "b" are positive integers selected from the group consisting of 2, 4 and 6 and "x", "y" and "z" are positive integers selected from the group consisting of numbers between 1 and 20.

11. The laminate of claim 1 wherein at least one layer has been treated with a chemical selected from the group consisting of water repellant chemicals, softening chemical, fire retardant chemicals, oil repellant chemicals and mixtures thereof.

12. The laminate of claim 1 wherein said crimpable spunbond fibers webs are comprised of bicomponent fibers in a sheath/core arrangement with polypropylene as the core and polyethylene as the sheath.

13. The laminate of claim 1 wherein said layers have basis weights between about 0.25 and 3 osy.

14. The laminate of claim 1 which is present in a product selected from the group consisting of medical products, personal care products and outdoor fabrics.

15. The laminate of claim 14 wherein said product is a personal care product and said personal care product is a diaper.

16. The laminate of claim 14 wherein said product is a personal care product and said personal care product is a feminine hygiene product.

17. The laminate of claim 14 wherein said product is a medical product and said medical product is a surgical gown.

18. The laminate of claim 14 wherein said product is a medical product and said medical product is a face mask.

19. The laminate of claim 14 wherein said product is a medical product and said medical product is a wiper.

* * * * *